(12) United States Patent
Xu et al.

(10) Patent No.: US 11,426,863 B2
(45) Date of Patent: Aug. 30, 2022

(54) FOUR-CHAIN SIX-DEGREE-OF-FREEDOM HYBRID MECHANISM

(71) Applicant: Yanshan University, Hebei (CN)

(72) Inventors: Yundou Xu, Hebei (CN); Shaoshuai Tong, Hebei (CN); Xiaofei Ma, Hebei (CN); Ze Zhao, Hebei (CN); Jiantao Yao, Hebei (CN); Zhirong Huang, Hebei (CN); Yongsheng Zhao, Hebei (CN)

(73) Assignee: Yanshan University, Qinhuangdao (CN)

( * ) Notice: Subject to any disclaimer, the term of this patent is extended or adjusted under 35 U.S.C. 154(b) by 174 days.

(21) Appl. No.: 16/928,839

(22) Filed: Jul. 14, 2020

(65) Prior Publication Data

US 2021/0060763 A1    Mar. 4, 2021

(30) Foreign Application Priority Data

Aug. 30, 2019 (CN) .......................... 201910814299.7

(51) Int. Cl.
*B25J 9/00* (2006.01)
*B23Q 1/44* (2006.01)
(Continued)

(52) U.S. Cl.
CPC .............. *B25J 9/0072* (2013.01); *B23Q 1/44* (2013.01); *B25J 5/02* (2013.01); *F16H 21/46* (2013.01)

(58) Field of Classification Search
CPC ..... B25J 5/005; B25J 5/02; B25J 9/003; B25J 9/0054; B25J 9/0072; F16H 21/46; B23Q 1/44
(Continued)

(56) References Cited

U.S. PATENT DOCUMENTS 6,099,217 A * 8/2000 Wiegand ................ B23Q 17/22
901/41
7,124,660 B2 * 10/2006 Chiang ..................... G09B 9/02
901/16
(Continued)

FOREIGN PATENT DOCUMENTS

EP           2444209 B1 *  4/2015   ............ B25J 9/1615

*Primary Examiner* — Joseph Brown
(74) *Attorney, Agent, or Firm* — Greensfelder, Hemker & Gale, P.C.; Richard C. Himelhoch

(57) ABSTRACT

The present invention provides a four-chain six-degree-of-freedom hybrid mechanism. The four-chain six-degree-of-freedom hybrid mechanism comprises a fixed platform, a sliding rail mounted on the fixed platform, two sliding blocks, a mobile platform and four linear actuator chains connecting the mobile platform with a first sliding block and a second sliding block. The mobile platform is square-shaped. In the four linear actuator chains, the first linear actuator chain and the third linear actuator chain have the same structure while the second linear actuator chain and the fourth linear actuator chain have the same structure. The mobile platform can achieve six degrees of freedom. The four linear actuator chains coordinate to drive so as to achieve two translational degrees of freedom and two rotational degrees of freedom; the first sliding block and the second sliding block coordinate to drive so as to achieve the other translational and rotational degrees of freedom.

4 Claims, 3 Drawing Sheets

(51) Int. Cl.
*F16H 21/46* (2006.01)
*B25J 5/02* (2006.01)

(58) Field of Classification Search
USPC .......................................... 74/490.08, 490.09
See application file for complete search history.

(56) References Cited

U.S. PATENT DOCUMENTS

| | | | | |
|---|---|---|---|---|
| 8,578,811 | B2* | 11/2013 | Alet | B25J 9/0042 |
| | | | | 74/490.09 |
| 9,205,566 | B2* | 12/2015 | Schwab | B25J 17/0266 |
| 10,434,322 | B2* | 10/2019 | Lee | B25J 9/0042 |
| 2002/0015624 | A1* | 2/2002 | Wang | B25J 9/0072 |
| | | | | 700/178 |
| 2004/0028516 | A1* | 2/2004 | Brogardh | B25J 17/0266 |
| | | | | 414/735 |
| 2004/0052628 | A1* | 3/2004 | Thurneysen | B25J 9/0072 |
| | | | | 414/730 |
| 2005/0129495 | A1* | 6/2005 | Brogardh | B25J 9/0072 |
| | | | | 414/680 |
| 2006/0254380 | A1* | 11/2006 | Bergmann | B23Q 1/5462 |
| | | | | 74/490.08 |
| 2018/0222042 | A1* | 8/2018 | Prüssmeier | B25J 9/1065 |
| 2018/0326587 | A1* | 11/2018 | Nose | F17C 13/12 |

* cited by examiner

FOUR-CHAIN SIX-DEGREE-OF-FREEDOM HYBRID MECHANISM

CROSS-REFERENCE TO RELATED APPLICATIONS

The present invention claims priority to and the benefit of Chinese Patent Application No. 201910814299.7 filed Aug. 30, 2019, the contents of which are incorporated herein by reference and made a part hereof.

TECHNICAL FIELD

The present invention relates to the field of robots, and more specifically, to a four-chain six-degree-of-freedom hybrid mechanism.

BACKGROUND

An object has six degrees of freedom in space, including three movements along three rectangular coordinate axes and three rotations around three rectangular coordinate lines, namely (X, Y, Z, $\alpha$, $\beta$, $\gamma$). If the six degrees of freedom of the object in space are determined, the position and the posture of the object in space are also determined.

The most common six-degree-of-freedom parallel mechanism is Stewart platform having six prismatic actuators. Since its invention, the Stewart platform is widely applied to various simulators, such as tank simulators, flight simulators, car driving simulators, ship simulators, etc., by virtue of its advantages that six degrees of freedom in space can be achieved and any motion postures of the object in space can be completely determined. However, the classic Stewart platform has a large mass, a short working stroke, a large volume and poor flexibility. Additionally, because chains are mutually connected and coupled, there are relatively more singular configurations, forward kinematics is complex, and an efficient analytic solution is hard to be obtained. The most widely applied six-degree-of-freedom serial mechanism is 6R mechanism. The 6R mechanism is widely applied to industrial robots such as conveying robots, package robots and the like by virtue of simple kinematics solution. However, due to self-characteristics, the mechanism has large inertia during motion, low bearing capability and small rigidity.

By comprehensively considering the advantages and the disadvantages of the parallel mechanism and the serial mechanism, a six-degree-of-freedom parallel and serial hybrid mechanism becomes an important research breakthrough direction.

SUMMARY

To solve the problems in the prior art, the objective of the present invention is to propose a four-chain six-degree-of-freedom hybrid mechanism, which is a few-chain six-degree-of-freedom serial and parallel hybrid mechanism having a few chains, a large working space, high flexibility and simple kinematic model, as well as easy to calibrate and control.

The present invention adopts a technical solution as follows:

A four-chain six-degree-of-freedom hybrid mechanism comprises a fixed platform, a sliding rail mounted on the fixed platform, two sliding blocks, a mobile platform and four linear actuator chains connecting the mobile platform with a first sliding block and a second sliding block.

The mobile platform is square-shaped. The first sliding block and the second sliding block have the same structure and shape, and are L-shaped. The first sliding block and the second sliding block are distributed in a centrosymmetric manner. The mobile platform is connected with the first sliding block and the second sliding block through the four linear actuator chains. The first sliding block and the second sliding block are connected with the fixed platform through the sliding rail. The first sliding block and the second sliding block can respectively synchronously or asynchronously move on the fixed platform along the sliding rail.

Preferably, in the four linear actuator chains, a first linear actuator chain and a third linear actuator chain have the same structure while a second linear actuator chain and a fourth linear actuator chain have the same structure. A first end of the first linear actuator chain is connected with the mobile platform through a first spherical pair, and a second end thereof is connected with the first sliding block through a first Hooke's joint. A first end of the second linear actuator chain is connected with the mobile platform through a second spherical pair, and a second end thereof is connected with the first sliding block through a first revolute pair. A first end of the third linear actuator chain is connected with the mobile platform through a third spherical pair, and a second end thereof is connected with the second sliding block through a second Hooke's joint. A first end of the fourth linear actuator chain is connected with the mobile platform through a fourth spherical pair, and a second end thereof is connected with the second sliding block through a second revolute pair.

Preferably, a revolute pair axis of the first Hooke's joint for connecting the first linear actuator chain with the first sliding block is vertical to the axis of the moving direction of the first sliding block when the first sliding block moves along the fixed platform. The axis of the first revolute pair for connecting the second linear actuator chain with the first sliding block is parallel with the axis of the moving direction of the first sliding block when the first sliding block moves along the fixed platform. A revolute pair axis of the second Hooke's joint for connecting the third linear actuator chain with the second sliding block is vertical to the axis of the moving direction of the second sliding block when the second sliding block moves along the fixed platform. The axis of the second revolute pair for connecting the fourth linear actuator chain with the second sliding block is parallel with the axis of the moving direction of the second sliding block when the second sliding block moves along the fixed platform.

Preferably, four hinged points of the four linear actuator chains on the mobile platform are distributed in the shape of a square. A revolute pair center of the first Hooke's joint for connecting the first linear actuator chain with the first sliding block is located at the center of the first sliding block vertical to its motion direction in an axial direction. A revolute pair center of the second Hooke's joint for connecting the third linear actuator chain with the second sliding block is located at the center of the second sliding block vertical to its motion direction in an axial direction. Hinged points of the two Hooke's joints connected with the first linear actuator chain and the third linear actuator chain and hinged points of the two revolute pairs connected with the second linear actuator chain and the fourth linear actuator chain are located on the same plane.

Preferably, the four linear actuator chains mutually coordinate to drive so as to achieve two rotational degrees of freedom and two translational degrees of freedom of the mobile platform, namely rolling, pitching, transverse movement and vertical movement. The first sliding block and the second sliding block synchronously move to achieve the translational degree of freedom of the mobile platform in the direction of the rail. The first sliding block and the second sliding block asynchronously move to achieve the rotational degree of freedom of the mobile platform.

Preferably, as a structure including the four linear actuator chains, the linear actuator unit can also be placed before the revolute pair or the Hooke's joint; that is, the actuator unit is mounted on the sliding block, and the axes of the four actuator units can be arranged vertically upwards. Or, the axes of the actuator units of the first chain and the third chain are parallel with a movement direction of the sliding block, and the axes of the actuator units of the second chain and the fourth chain are vertical to the movement direction of the sliding block.

Compared with the prior art, the present invention has the following advantages:

The mechanism of the present invention has a simple structure, a few chains, a large working space, high bearing capability and high flexibility. Furthermore, the kinematic model of the present invention is simple, and the kinematic decoupling performance is strong (wherein a few inputs control the single output); so, the kinematics calibration and control are simple, and the application prospect is wider.

Comparing with the platform of the common six-chain six-degree-of-freedom parallel mechanism, the platform of the hybrid mechanism only has four chains. The number of the chains is reduced, the motion flexibility is stronger, the kinematic decoupling performance is strong, the kinematic model is simple and the mechanism is easy to control. Additionally, the mechanism of the present invention can achieve large-range movement along the rail to greatly overcome the disadvantage of a small motion space of the parallel mechanism, and it has excellent application prospect.

BRIEF DESCRIPTION OF THE DRAWINGS

The following is a detailed description of the technical solution of the present invention with reference to the accompanying drawings.

Figure 1:
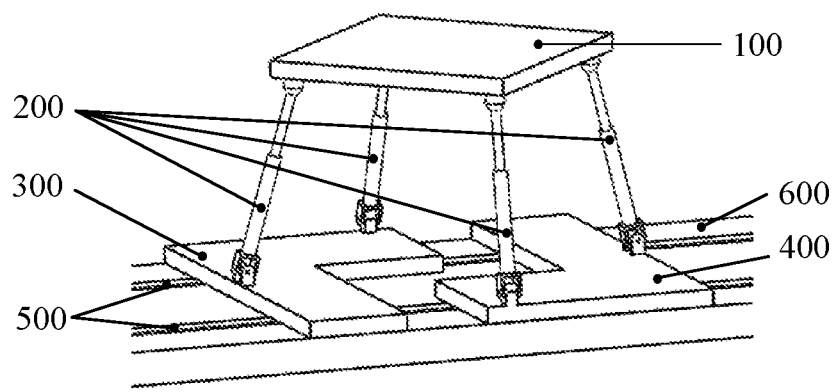
FIG. 1 is a schematic diagram showing a stereo structure of the present invention.

In the drawings: 100—mobile platform, 200—linear actuator chain, 300—first sliding block, 400—second sliding block, 500—sliding rail, 600—fixed platform, 210—second linear actuator chain, 220—first linear actuator chain, 230—fourth linear actuator chain, 240—third linear actuator chain, 221—first spherical pair, 222—first Hooke's joint, 223—revolute pair axis of the first Hooke's joint, 224—revolute pair center of the first Hooke's joint, 211—second spherical pair, 212—first revolute pair, 213—axis of the first revolute pair, 241—third spherical pair, 242—second Hooke's joint, 243—revolute pair axis of the second Hooke's joint, 244—revolute pair center of the second Hooke's joint, 231—fourth spherical pair, and 232—second revolute pair, 233—axis of the second revolute pair.

DESCRIPTION OF THE EMBODIMENTS

Exemplary embodiments, features and aspects of the present invention will be described in detail below with reference to the accompanying drawings. The same reference numerals in the above-mentioned drawings indicate the same components having the same or similar functions. Although the various aspects of the embodiments are illustrated in the drawings, the drawings are not necessarily drawn to scale unless otherwise indicated.

As shown in FIG. 1 to FIG. 6, a four-chain six-degree-of-freedom hybrid mechanism according to an embodiment of the present invention comprises a fixed platform 600 and a mobile platform 100, which are connected with linear actuator chains. The fixed platform 600 is located at the lower portion. The mobile platform 100 is arranged at the upper ends of the linear actuator chains and is driven by each linear actuator chain. The linear actuator chains 200 comprise a second linear actuator chain 210, a first linear actuator chain 220, a fourth linear actuator chain 230 and a third linear actuator chain 240.

Preferably, the fixed platform 600 is provided with a sliding rail and sliding blocks. The sliding blocks comprise a first sliding block and a second sliding block. The sliding rail 500 comprises a first sliding rail and a second sliding rail. The two sliding rails are parallel with each other. The first sliding block 300 and the second sliding block 400 can do reciprocating movement along the sliding rail 500 to achieve opening and closing of the first sliding block 300 and the second sliding block 400.

To two of the four chains, for example, the lower end of the second linear actuator chain and the lower end of the first linear actuator chain are connected to the first sliding block 300. Preferably, the second linear actuator chain 210 is arranged at the end part of a portion of the first sliding block in contact with the second sliding block.

The lower end of the first linear actuator chain 220 is connected to the middle point of the end part, away from the second sliding block, of the first sliding block 300.

To the other of the four chains, for example, the lower end of the fourth linear actuator chain 230 and the lower end of the third linear actuator chain 240 are connected to the second sliding block 400. Preferably, the fourth linear actuator chain 230 is arranged at the end part of a portion of the second sliding block in contact with the first sliding block.

The lower end of the third linear actuator chain 240 is connected to the middle point of the end part, away from the first sliding block 300, of the second sliding block 400.

The first sliding block and the second sliding block move to drive each linear actuator chain to move.

Preferably, the mobile platform is square-shaped. The first sliding block and the second sliding block have the same structure and shape, and are L-shaped. The first sliding block and the second sliding block are distributed in a centrosymmetric manner. The mobile platform is connected with the first sliding block and the second sliding block through the four linear actuator chains. The first sliding block and the second sliding block are connected with the fixed platform through the sliding rail. The first sliding block and the second sliding block can respectively synchronously or asynchronously move on the fixed platform along the sliding rail.

In the four linear actuator chains, the first linear actuator chain and the third linear actuator chain have the same structure while the second linear actuator chain and the fourth linear actuator chain have the same structure. A first end of the first linear actuator chain is connected with the mobile platform through a first spherical pair, and a second end thereof is connected with the first sliding block through a first Hooke's joint. A first end of the second linear actuator chain is connected with the mobile platform through a second spherical pair, and a second end thereof is connected with the first sliding block through a first revolute pair. A first end of the third linear actuator chain is connected with the mobile platform through a third spherical pair, and a second end thereof is connected with the second sliding block through a second Hooke's joint. A first end of the fourth linear actuator chain is connected with the mobile platform through a fourth spherical pair, and a second end thereof is connected with the second sliding block through a second revolute pair.

A revolute pair axis 223 of the first Hooke's joint for connecting the first linear actuator chain with the first sliding block is vertical to the axis of the moving direction of the first sliding block when the first sliding block moves along the fixed platform. The axis 213 of the first revolute pair for connecting the second linear actuator chain with the first sliding block is parallel with the axis of the moving direction of the first sliding block when the first sliding block moves along the fixed platform. A revolute pair axis 243 of the second Hooke's joint for connecting the third linear actuator chain with the second sliding block is vertical to the axis of the moving direction of the second sliding block when the second sliding block moves along the fixed platform. The axis 233 of the second revolute pair for connecting the fourth linear actuator chain with the second sliding block is parallel with the axis of the moving direction of the second sliding block when the second sliding block moves along the fixed platform.

Four hinged points of the four linear actuator chains on the mobile platform are distributed in the shape of a square. A revolute pair center 224 of the first Hooke's joint for connecting the first linear actuator chain with the first sliding block is located at the center of the first sliding block vertical to its motion direction in an axial direction. A revolute pair center 244 of the second Hooke's joint for connecting the third linear actuator chain with the second sliding block is located at the center of the second sliding block vertical to its motion direction in an axial direction. Hinged points of the two Hooke's joints connected with the first linear actuator chain and the third linear actuator chain and hinged points of the two revolute pairs connected with the second linear actuator chain and the fourth linear actuator chain are located on the same plane.

The first sliding block and the second sliding block can achieve synchronous movement or asynchronous motion. When the motion speeds and directions of the first sliding block and the second sliding block are the same, the whole platform except the fixed platform can move along the fixed platform. When the first sliding block and the second sliding block are separated from each other during motion, the first linear actuator chain and the third linear actuator chain simultaneously rotates and extend anticlockwise; the second linear actuator chain and the fourth linear actuator chain do not change; the mobile platform rotates anticlockwise. When the first sliding block and the second sliding block are close to each other during the motion, the first linear actuator chain and the third linear actuator chain simultaneously rotates and extend clockwise; the second linear actuator chain and the fourth linear actuator chain do not change; the mobile platform rotates clockwise.

As shown in FIG. 1, which is a schematic structural diagram of a four-chain six-degree-of-freedom hybrid mechanism, the mobile platform 100 is square-shaped. The first sliding block 300 and the second sliding block 400 have the same structure and shape, and are L-shaped. The first sliding block and the second sliding block are distributed in a centrosymmetric manner. The mobile platform 100 is connected with the first sliding block 300 and the second sliding block 400 through the four linear actuator chains 200. The first sliding block 300 and the second sliding block 400 are connected with the fixed platform 600 through the sliding rail 500. The first sliding block 300 and the second sliding block 400 can respectively synchronously or asynchronously move on the fixed platform 600 along the sliding rail 500.

Figure 2:
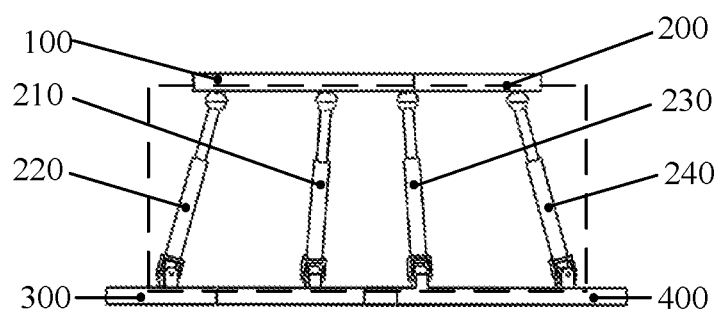
FIG. 2 is a schematic structural diagram of a mobile platform and linear actuator chains of the present invention.

As shown in FIG. 2, in the four linear actuator chains 200, the first linear actuator chain 220 and the third linear actuator chain 240 have the same structure while the second linear actuator chain 210 and the fourth linear actuator chain 230 have the same structure.

Figure 3:
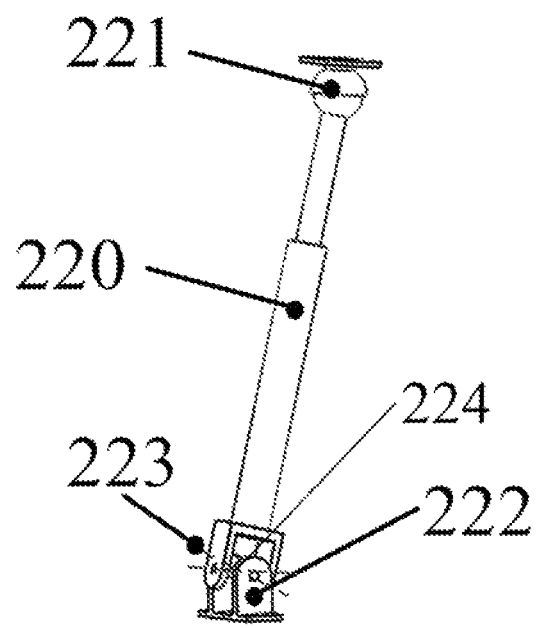
FIG. 3 is a schematic structural diagram of a first linear actuator chain.

As shown in FIG. 3, the first end of the first linear actuator chain 220 is connected with the mobile platform 100 through the first spherical pair 221, and the second end thereof is connected with the first sliding block 300 through the first Hooke's joint 222.

Figure 4:
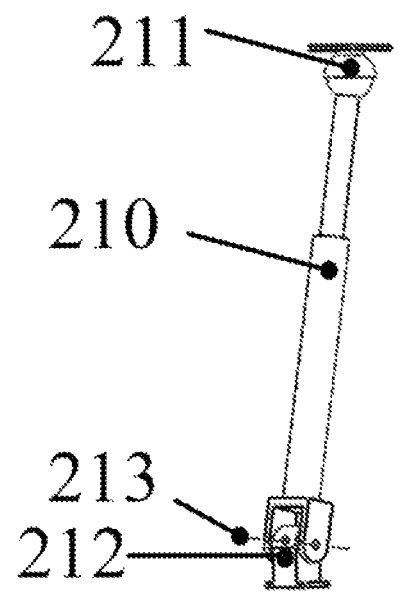
FIG. 4 is a schematic structural diagram of a second linear actuator chain.

As shown in FIG. 4, the first end of the second linear actuator chain 210 is connected with the mobile platform 100 through the second spherical pair 211, and the second end thereof is connected with the first sliding block 300 through the first revolute pair 212.

Figure 5:
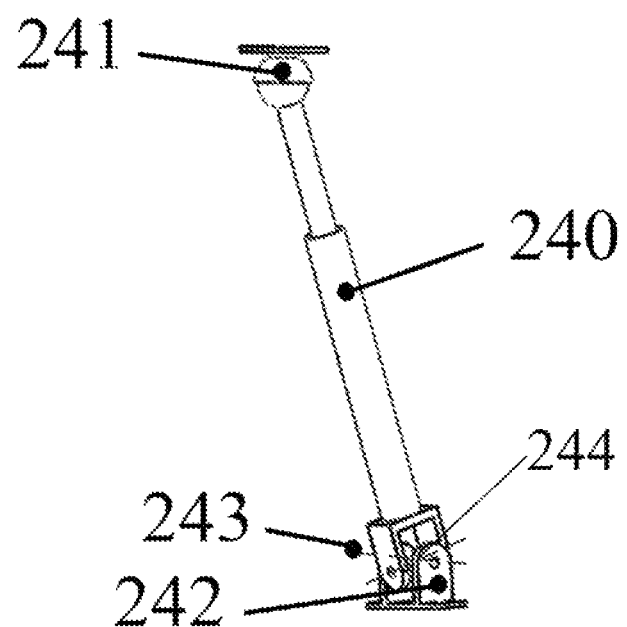
FIG. 5 is a schematic structural diagram of a third linear actuator chain.

As shown in FIG. 5, the first end of the third linear actuator chain 240 is connected with the mobile platform 100 through the third spherical pair 241, and the second end thereof is connected with the second sliding block 400 through the second Hooke's joint 242.

Figure 6:
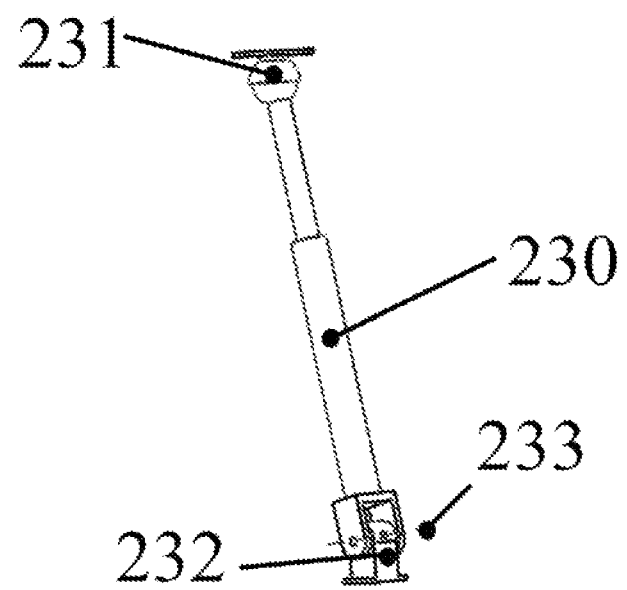
FIG. 6 is a schematic structural diagram of a fourth linear actuator chain.

As shown in FIG. 6, the first end of the fourth linear actuator chain 230 is connected with the mobile platform 100 through the fourth spherical pair 231, and the second end thereof is connected with the second sliding block 400 through the second revolute pair 232.

A revolute pair axis of the first Hooke's joint 222 for connecting the first linear actuator chain 220 with the first sliding block 300 is vertical to the axis of the moving direction of the first sliding block 300 when the first sliding block moves along the fixed platform 600. The axis of the first revolute pair 212 for connecting the second linear actuator chain 210 with the first sliding block 300 is parallel with the axis of the moving direction of the first sliding block 300 when the first sliding block moves along the fixed platform 600. A revolute pair axis of the second Hooke's joint 242 for connecting the third linear actuator chain 240 with the second sliding block 400 is vertical to the axis of the moving direction of the second sliding block 400 when the second sliding block moves along the fixed platform 600. The axis of the second revolute pair 232 for connecting the fourth linear actuator chain 230 with the second sliding block 400 is parallel with the axis of the moving direction of the second sliding block 400 when the second sliding block moves along the fixed platform 600.

Four hinged points of the four linear actuator chains 200 on the mobile platform 100 are distributed in the shape of a square. A revolute pair of the first Hooke's joint 222 for connecting the first linear actuator chain 220 with the first sliding block 300 is located at the center of the first sliding block 300 vertical to its motion direction in an axial direction. A revolute pair of the second Hooke's joint 242 for connecting the third linear actuator chain 240 with the second sliding block 400 is located at the center of the second sliding block 400 vertical to its motion direction in an axial direction. Hinged points of the two Hooke's joints connected with the first linear actuator chain 220 and the third linear actuator chain 240 and hinged points of the two revolute pairs connected with the second linear actuator chain 210 and the fourth linear actuator chain 230 are located on the same plane.

To a structure including the four linear actuator chains of the present invention, the linear actuator unit can also be placed before the revolute pair or the Hooke's joint; that is, the actuator unit is mounted on the sliding block, and the axes of the four actuator units can be arranged vertically upwards. Or, the axes of the actuator units of the first chain and the third chain are parallel with a movement direction of the sliding block, and the axes of the actuator units of the second chain and the fourth chain are vertical to the movement direction of the sliding block.

The following further explains the working principle of the present invention.

The mechanism can achieve six-degree-of-freedom motion: the four linear actuator chains 200 mutually coordinate to drive so as to achieve two rotational degrees of freedom and two translational degrees of freedom of the mobile platform 100, namely rolling, pitching, transverse movement and vertical movement. The first sliding block 300 and the second sliding block 400 synchronously move to achieve the vertical translational degree of freedom of the mobile platform 100 in the direction of the rail. The first sliding block 300 and the second sliding block 400 asynchronously move to achieve the rotational degree of freedom of the mobile platform 100.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A four-chain six-degree-of-freedom hybrid mechanism, comprising a fixed platform, a sliding rail mounted on the fixed platform, two sliding blocks, a mobile platform and four linear actuator chains connecting the mobile platform with a first sliding block and a second sliding block, wherein the mobile platform is square-shaped; the first sliding block and the second sliding block have the same structure and shape, and are L-shaped; the first sliding block and the second sliding block are distributed in a centrosymmetric manner; the mobile platform is connected with the first sliding block and the second sliding block through the four linear actuator chains; the first sliding block and the second sliding block are connected with the fixed platform through the sliding rail; the first sliding block and the second sliding block synchronously or asynchronously move on the fixed platform along the sliding rail;

wherein, in the four linear actuator chains, the first linear actuator chain and the third linear actuator chain have the same structure while the second linear actuator chain and the fourth linear actuator chain have the same structure; a first end of the first linear actuator chain is connected with the mobile platform through a first spherical pair, and a second end thereof is connected with the first sliding block through a first Hooke's joint; a first end of the second linear actuator chain is connected with the mobile platform through a second spherical pair, and a second end thereof is connected with the first sliding block through a first revolute pair; a first end of the third linear actuator chain is connected with the mobile platform through a third spherical pair, and a second end thereof is connected with the second sliding block through a second Hooke's joint; a first end of the fourth linear actuator chain is connected with the mobile platform through a fourth spherical pair, and a second end thereof is connected with the second sliding block through a second revolute pair.

2. The four-chain six-degree-of-freedom hybrid mechanism according to claim 1, wherein a revolute pair axis of the first Hooke's joint for connecting the first linear actuator chain with the first sliding block is perpendicular to a moving direction of the first sliding block when the first sliding block moves along the fixed platform; an axis of the first revolute pair for connecting the second linear actuator chain with the first sliding block is parallel with the moving direction of the first sliding block when the first sliding block moves along the fixed platform; a revolute pair axis of the second Hooke's joint for connecting the third linear actuator chain with the second sliding block is perpendicular to a moving direction of the second sliding block when the second sliding block moves along the fixed platform; an axis of the second revolute pair for connecting the fourth linear actuator chain with the second sliding block is parallel with the moving direction of the second sliding block when the second sliding block moves along the fixed platform.

3. The four-chain six-degree-of-freedom hybrid mechanism according to claim 1, wherein four hinged points of the four linear actuator chains on the mobile platform are distributed in a shape of a square; a revolute pair center of the first Hooke's joint for connecting the first linear actuator chain with the first sliding block is located at a center of the first sliding block in a direction perpendicular to a moving direction of the first sliding block; a revolute pair center of the second Hooke's joint for connecting the third linear actuator chain with the second sliding block is located at a center of the second sliding block in a direction perpendicular to a moving direction of the second sliding block; hinged points of the two Hooke's joints connected with the first linear actuator chain and the third linear actuator chain and hinged points of the two revolute pairs connected with the second linear actuator chain and the fourth linear actuator chain are located on a same plane.

4. The four-chain six-degree-of-freedom hybrid mechanism according to claim 1, wherein the four linear actuator chains mutually coordinate to drive so as to achieve two rotational degrees of freedom and two translational degrees of freedom of the mobile platform, comprising rolling, pitching, transverse movement and vertical movement; the first sliding block and the second sliding block synchronously move to achieve a translational degree of freedom of the mobile platform in a direction of the rail; the first sliding block and the second sliding block asynchronously move to achieve a rotational degree of freedom of the mobile platform.

* * * * *